United States Patent
Gubler et al.

(10) Patent No.: US 8,653,406 B2
(45) Date of Patent: Feb. 18, 2014

(54) LASER OPERATING PROCESS AND LASER DEVICE

(75) Inventors: Ulrich Gubler, Rotkreuz (CH); Michael Scheidt, Wetzikon (CH)

(73) Assignee: Leister Technologies AG, Kagiswil (CH)

( * ) Notice: Subject to any disclaimer, the term of this patent is extended or adjusted under 35 U.S.C. 154(b) by 1299 days.

(21) Appl. No.: 12/433,979

(22) Filed: May 1, 2009

(65) Prior Publication Data

US 2009/0272724 A1    Nov. 5, 2009

(30) Foreign Application Priority Data

May 2, 2008  (EP) .................................. 08008336

(51) Int. Cl.
| B23K 26/04 | (2006.01) |
| B23K 26/20 | (2006.01) |
| B23K 26/36 | (2006.01) |

(52) U.S. Cl.
USPC ............. 219/121.62; 219/121.63; 219/121.67

(58) Field of Classification Search
USPC ............. 219/121.61–121.76, 121.83; 372/25; 250/201.1–205
See application file for complete search history.

(56) References Cited

U.S. PATENT DOCUMENTS

| 4,102,572 A |   | 7/1978  | O'Meara |
| 4,707,596 A | * | 11/1987 | Hohberg .................... 250/201.8 |
| 4,719,912 A | * | 1/1988  | Weinberg ........................ 606/4 |
| 5,017,755 A | * | 5/1991  | Yahagi et al. ............. 219/121.68 |
| 5,566,024 A | * | 10/1996 | Rauch ........................... 359/571 |
| 6,507,003 B2 |   | 1/2003  | Amako et al. |
| 6,931,991 B1 | * | 8/2005  | Cheng et al. ................ 101/401.1 |
| 7,244,907 B2 | * | 7/2007  | Hogan ....................... 219/121.71 |
| 7,425,471 B2 | * | 9/2008  | Bruland et al. ................ 438/130 |
| 2002/0021723 A1 |   | 2/2002  | Amako et al. |
| 2004/0200812 A1 |   | 10/2004 | Grewell et al. |
| 2005/0098548 A1 |   | 5/2005  | Kobayashi et al. |
| 2005/0107773 A1 | * | 5/2005  | Bergt et al. ........................ 606/4 |

FOREIGN PATENT DOCUMENTS

| DE | 198 36 115    | 3/1999 |
| DE | 198 25 092    | 12/1999 |
| DE | 199 59 862    | 6/2001 |
| DE | 10 2004 017 129 | 10/2004 |
| JP | 9-323184 A    | 12/1997 |
| JP | 2002-113589 A | 4/2002 |

OTHER PUBLICATIONS

European Search Report for corresponding Application No. EP 08 00 8336 dated Oct. 17, 2008.

* cited by examiner

*Primary Examiner* — Samuel M Heinrich
(74) *Attorney, Agent, or Firm* — Renner, Otto, Boisselle & Sklar, LLP (57) ABSTRACT

A device and a process for processing and/or joining work pieces via laser radiation, with an effective power laser and a pilot target laser that emit laser beams of different wavelengths, with the laser beams being directed at the work pieces by laser optics. Regarding the laser beams, by the laser optics that comprise at least one diffractive optical element (DOE) as a masking system, the beam pattern of the pilot target laser is adjusted to match the beam pattern of the effective laser beam. This is accomplished preferably by removing the pilot laser beam from the effective laser beam for part of the path length by dichroic mirrors, and by expanding the diverging pilot laser beam on said part of the path length by deflecting mirrors whose distance from the dichroic mirrors is variable.

13 Claims, 5 Drawing Sheets

LASER OPERATING PROCESS AND LASER DEVICE

CROSS-REFERENCE TO RELATED APPLICATION

The present application claims priority under 35 USC §119 to European Patent Application No. 08 008 336.3, filed on May 2, 2008, the entire disclosure of which is incorporated herein by reference.

TECHNICAL FIELD OF THE INVENTION

The invention concerns a process for processing and/or joining work pieces by means of laser radiation, with an effective power laser and a pilot target laser that emit an effective laser beam and a pilot laser beam of different wavelengths, with the laser beams being directed at the work pieces by means of laser optics, and with the laser beams of the effective laser and of the pilot target laser being imaged on the work pieces with randomly selectable beam patterns that are superimposed and identical in terms of position and form. The invention also concerns a laser device for performing the proposed process. The pilot target laser is a laser emitting in the visible spectral range that simplifies the set-up process and the process control.

DESCRIPTION OF THE RELATED ART

Laser devices and laser processes are known from the field. When processing or joining work pieces by means of electromagnetic radiation, specifically with a laser beam, the size and the form of the beam profile directed at the work pieces play an important role. In addition, the correctly adjusted power density distribution within the generated focal spot is also an important factor. Furthermore, it is often necessary to produce heat distribution patterns or welding seams in a variety of shapes on the work pieces by means of the laser beam. For this purpose, a focused beam spot is generated on the work pieces by means of the effective power laser that is being used, with the size and form of said beam spot selected to produce optimum results for the laser operation to be performed.

The selection of the desired beam spot and the exact positioning of the beam spot in relation to the work pieces, in order to act thereon either at a certain point at a certain location or along a pre-selected line by means of the effective laser beam, frequently causes problems because the laser light of the effective power laser is usually not visible, or only visible with great difficulty. Beside the setting-up process of the laser device, this is also true for the laser processing of the work pieces, thereby making continual monitoring of the process during the laser treatment difficult.

In order to reduce the difficulties, it is a known practice to introduce into the beam path of the effective laser beam a pilot laser beam emitted by a pilot target laser with a visible wavelength range. The pilot laser beam is guided and shaped so that, in relation to the invisible beam spot of the effective power laser, its visible beam spot has an essentially identical form, and that the centers of the two beam spots are superimposed. Due to the different wavelengths of the effective laser beam and of the pilot laser beam, the laser optics usually affect the laser beams of the effective power laser and of the pilot laser beam in different ways so that, compared with that of the effective power laser, the beam spot of the pilot laser beam has a smaller diameter on the work pieces.

It is frequently desirable or necessary to know the exact size of the beam spot of the effective power laser acting on the work pieces. In order to compensate for the differences between the wavelengths of the pilot laser beam and of the effective laser beam and for the associated differences in refraction and focusing behavior, it is necessary to expand the pilot laser beam, thereby matching the size and/or the pattern of the beam spot of the pilot laser beam to the size and/or pattern of the effective laser beam.

If, instead of a round beam profile, a beam profile of a different shape is required for a specific heat distribution pattern, the round beam profile emitted by the laser source must be transformed to the desired size and the required shape by means of suitable measures, for example with a diffractive optical element (DOE). For a simultaneous welding process, this can be accomplished by optics or masks specifically designed for the task (fixed DOEs) or by electronically controllable optics (variable DOEs). Instead of a round beam spot, this makes it possible to generate any beam pattern on the work pieces that might be desired.

The patent DE 198 25 092 C2 and the patent disclosure DE 198 36 115 A1 disclose laser systems with an effective laser and a pilot laser where the beam cross-section of the pilot laser is matched to the beam cross-section of the effective laser by means of an expansion and focusing system so that they produce circular beam spots of identical size on the work pieces. As is common practice, the shaping of the beam is accomplished by means of converging or diverging lenses or mirrors, in conjunction with fully reflecting or semi-permeable mirrors. The laser sources of the citations have a round beam profile that can be modulated by means of one or several diffractive optical elements to produce a beam profile of any cross-sectional shape that may be desired. Especially well suited for this is an electronic position-detecting beam modulator that is able to change the amplitude and/or the polarization and/or the phase of the laser light.

A beam modulator that alters the polarization of the laser light is disclosed in DE 10 2004 017 129 A1. The beam modulator that is specified there makes it possible to polarize individual sections of the laser beam in order to define modified and unmodified sections. The beam modulator is followed by a polarizing filter in order to selectively prevent the passage of the modified or unmodified sections so that, after passing through the polarizing filter, the laser beam has a certain beam profile in its cross-section that is determined by the beam modulator.

From US 2002/0021723 A1, a laser device is known where two laser beams of different wavelengths are used for processing work pieces. The effective laser beams emitted by different effective laser sources are joined by means of a special semi-permeable mirror and are imaged simultaneously on the work pieces via a phase-influencing diffraction screen.

US 2005/0098548 A1 discloses another processing device employing a laser beam that has holding elements for holding a work piece and laser application elements for exposing the work piece to the radiation of a pulsed laser beam. The laser beam is capable of passing though the work piece, with the laser application elements comprising devices for transmitting and focusing the laser beam. Said devices have oscillation elements that are able to focus the laser beam alternatingly on at least two focal points.

SUMMARY OF THE INVENTION

This invention addresses the problem of proposing a method for unifying and making congruent the differing beam patterns of a modulated effective power laser beam and of a pilot laser beam of different wavelengths on the work pieces, with their beam patterns being adjustable by means of an electronic position-detecting beam modulator that changes the amplitude and/or the polarization and/or the phase of the laser light, and with the beam profile of the effective power laser and of the pilot laser beam having a non-uniform spatial intensity distribution.

According to the process proposed by the invention for the processing and/or joining of work pieces by means of laser radiation, a laser device—comprising an effective power laser and a pilot target laser that emit, via laser optics, a pilot laser beam and an effective laser beam of different wavelengths directed at the work pieces—is used for imaging, by means of laser optics that comprise at least one diffractive optical element (DOE), the laser beams of the effective power laser and of the pilot target laser on the work pieces with randomly selectable, preferably superimposed beam patterns that are identical in terms of position, form, and size. The at least one diffractive optical element integrated into the laser optics determines the form of the beam patterns on the work pieces.

The beam patterns of the effective laser beam and of the pilot laser beam can be generated, dependent on each other, by means of a single DOE that influences the beams of the effective power laser and the pilot target laser in the same way, with the DOE being able to affect the beams in case of a transmission through the DOE or a reflection on the DOE. The laser beams of the effective power laser and the pilot target laser that are to be influenced may be directed at the diffractive optical element either simultaneously, alternatingly, or each by itself. It is also possible to use two diffractive optical elements, arranged side by side, for forming the beam patterns of the two laser beams. The two DOEs may be of the same or of different designs. They generate the beam patterns of the effective laser beam and of the pilot laser beam independently of each other, and influence the beams in the same or in different ways. Here, too, the laser beams of the effective power laser and the pilot target laser that are to be influenced may be directed at the appropriate diffractive optical element either simultaneously, alternatingly, or each by itself.

In the new process, either a diffractive optical element that generates beam patterns with the same shape but different sizes is used jointly for the two laser beams. After the DOE, the smaller beam cross-section of the pilot laser beam is then adjusted to match the larger beam cross-section of the effective laser beam so that the size of the beam patterns on the work pieces is approximately the same. As an alternative, two diffractive optical elements of different designs are used to determine the form and the size of the beam patterns, with one diffractive optical element associated with each of the two laser beams. Preferably, the two diffractive optical elements are designed to match the beam cross-section of the pilot laser beam and the beam cross-section of the effective laser beam to each other so that the size of the beam patterns on the work pieces is approximately the same.

In a preferred embodiment of the invention, the pilot laser beam is advantageously separated from the effective laser beam for a section of the path between the diffractive optical element that is operated in transmission or reflection mode and the work pieces. The cross-section of the separated pilot laser beam is enlarged to match that of the effective laser beam on the work pieces.

In a preferred course of the process according to the invention, the pilot laser beam is removed from and re-introduced into the beam path of the effective laser beam by means of mirrors that are dependent on wavelength. These wavelength-dependent mirrors deflect the pilot laser beam or the effective laser beam while letting the other laser beam in each case pass essentially unimpeded.

According to an advantageous course of the process, the cross-section of the pilot laser beam, after its separation from the effective laser beam, is expanded by means of deflecting mirrors that are arranged at a distance from each other and whose distance from the dichroic mirrors is variable, and matched to the beam cross-section of the effective laser beam on the work pieces, with the dichroic mirrors representing beam deflection elements and the deflecting mirrors representing beam expansion elements. Here, the extension of the path length of the beam path of the pilot laser beam results in the expansion of the pilot laser beam due to the increasing divergence. The additional path length for the pilot laser beam is variable in that the two deflecting mirrors that are arranged at an angle of 90 degrees relative to each other can either be moved towards the deflecting elements or a certain distance away therefrom.

When two diffractive optical elements acting independently of each other are used, an additional beam expansion of the pilot laser beam between the associated DOE and the work pieces is no longer necessary, depending on the design of the two DOEs and their position relative to each other, to the work pieces, and to the effective power laser or the pilot target laser. With a suitable selection of these factors, the beam expansion system following the DOE in its entirety, or its beam deflecting elements, or its beam expansion elements may be omitted.

In the device according to the invention for processing and/or joining work pieces by means of laser radiation, the laser optics image the laser beams of the effective power laser and of the pilot target laser on the work pieces in a randomly selectable beam pattern that is identical in terms of position and form. In order to determine the form of the beam pattern of the two laser beams, the laser optics of the device comprise at least one diffractive optical element and, in order to determine an essentially uniform size of the beam patterns, a beam expansion system that matches the size of the beam pattern of the pilot target laser to the size of the beam pattern of the effective power laser. Preferably, the beam expansion system for the pilot laser beam follows the at least one diffractive optical element (DOE) in the beam path. The effective power laser and the pilot target laser emit laser beams of different wavelengths, with the wavelength of the pilot target laser being smaller than that of the effective power laser and in a spectral range that is visible to the human eye. It is possible to image the beam patterns of the effective power laser and of the pilot laser beam either simultaneously or alternatingly. In an alternating operation, the imaging duration of the two beam patterns may be the same or different. Of course, the beam pattern of the pilot laser may be completely switched off during the welding process, and may be switched on temporarily for monitoring purposes at any point in time.

The diffractive optical element that is capable of sharply imaging a laser beam on the work pieces without additional aids may be operated in transmission or in reflection mode and modulates the phase of the laser light spatially. It is the purpose of the phase modulation to modulate the phase of the laser light in such a way that a desired pattern of indifference is generated. Fixed or variable DOEs may be used for this. With a fixed DOE, the phase information is written permanently into the material, for example by etched structures in the surface or by volume-produced refractory index differences. Variable DOEs are electro-optical components that can be controlled electronically.

For example, if a liquid crystal phase modulator is used as a variable DOE, it changes, starting from a polarized radiation field with sufficient transversal coherence, the phase relationship of individual sub-ranges of the arriving laser beams in a controlled manner so that the sub-ranges interfere in the desired manner after the diffractive optical element. The liquid crystal cells divide the arriving laser beam into individual bundles of sub-beams. Each of the bundles of sub-beams is phase-modulated in a certain way in the individually controllable cells. After leaving the DOE, the individual sub-beams in their entirety form a new laser beam. Here, the modulation of a bundle of sub-beams that is determined by the associated liquid crystal cell is performed in an especially simple and flexible manner and, particularly, independent of the other bundles of sub-beams.

In the laser device according to the invention, the fixed or variable diffractive optical element affects the pilot laser beam as well as the effective laser beam in the same way. The DOE for the pilot laser beam and the effective laser beam can be operated in the same way or in a different way in terms of transmission or reflection, and the laser beams of the pilot target laser and of the effective power laser can be directed at the DOE from one or different directions. Also, the two laser beams may arrive at the at least one DOE on one or different sides.

Every laser beam emitted by a laser source has a certain convergence, i.e. an expansion that increases with distance after the beam exits from the laser source, which represents a measure of the beam quality. The low convergence of the pilot laser beam and of the effective laser beam before the diffractive optical element, that may also be different, is influenced by the diffraction and the phase modulation on the DOE so that after the DOE, the laser beams of the pilot target laser and of the effective power laser propagate spatially in the desired manner. Due to the different wavelengths of the pilot laser beam and of the effective laser beam, their expansion after the diffractive optical element is different, causing the pilot laser beam and the effective laser beam to produce beam patterns of different sizes on the work pieces.

In order to enlarge the beam pattern of the pilot target laser, which is smaller than that of the effective power laser, to match the size of the beam pattern of the effective power laser, the laser optics of the laser device according to the invention comprise a beam expansion system that changes the size of the pilot laser beam pattern by controllably expanding the beam cross-section of the pilot laser beam as desired. In order for the beam expansion system to be able to influence the laser beam of the pilot target laser independent of the effective laser beam, it is necessary to separate the pilot laser beam from the effective laser beam after the diffractive optical element.

For this purpose, the expansion system advantageously comprises beam deflection elements between the DOE and the work pieces that remove the pilot laser beam from the beam path of the effective laser beam for a part of the path length. Preferably, the removal from and/or the re-introduction of the pilot laser beam into the effective laser beam are accomplished with wavelength-dependent mirrors.

The wavelength-dependent mirrors, also known as dichroic mirrors, are used as beam separators. Preferably, they don't change the propagation direction of the effective laser beam, and deflect the pilot laser beam in its direction by preferably 90 degrees by means of reflection on their surface. For this purpose, they are arranged ideally at an angle of 45 degrees relative to the optical axis of the laser optics. Depending on whether the DOE for the laser beams of the pilot laser and effective laser is to be operated in reflection or transmission mode, and on the angle to the optical axis of the laser optics the laser beams exit from the pilot target laser and the effective power laser, the two wavelength-dependent mirrors may be arranged above, below, or below and above the DOE. The two dichroic mirrors may be arranged parallel or at an angle of 90 degrees to each other.

In an advantageous embodiment of the invention, the beam expansion system comprises expansion elements for enlarging the beam cross-section of the pilot target laser. The beam expansion elements are arranged in that part of the path length for the laser beam of the pilot laser that is determined by the wavelength-dependent mirrors. They adjustably expand the beam cross-section, making use of the divergence of the pilot laser beam, without influencing the divergence of the effective laser beam. Preferably, after the removal of the pilot laser beam from the effective laser beam with one of the beam deflecting elements, the pilot laser beam is expanded by means of two deflecting mirrors whose distance from the dichroic mirrors representing the beam deflection elements is variable. The two deflecting mirrors are total-reflection mirrors and each deflects the pilot laser beam by 90 degrees. Preferably, they are each arranged with an inclination of 45 degrees relative to the optical axis of the laser optics and are aligned in the direction of the dichroic mirrors or the diffractive optical element. It is also possible to change, additionally or by itself, the distance separating the deflecting mirrors that form the beam expansion element.

The two deflecting mirrors act together with the two wavelength-dependent mirrors and, according to one embodiment, with a wavelength-dependent mirror and the DOE, and expand the pilot laser beam variably between the beam removal location and the re-introduction location of the laser optics by extending the path length between the DOE and the work pieces in relation to the direct path length. The smaller deflection angle of the pilot laser beam in comparison with the larger deflection angle of the effective laser beam is compensated by the circumstance that, additionally, the beam cross-section of the pilot laser beam enlarges on the extended path length due to its divergence. The distance of the two beam expansion elements from the beam deflection elements can be adjusted so that the length of the path for the pilot laser beam is variable, thereby permitting the size of the beam pattern of the pilot laser beam on the work pieces to be matched to the size of the beam pattern of the effective laser beam.

Regarding the compensation referred to above, it is possible to use a single or two DOEs, preferably arranged side by side, to determine the spatial intensity distribution of the beam profile of the pilot target laser and the effective power laser.

An alternative results from the use of two different DOEs for the separate influencing of the pilot laser beam and of the effective laser beam. Preferably, the two DOEs are arranged side by side on a common carrier that is supported in the laser optics so that it can be shifted transversely relative to the effective laser beam or the pilot laser beam. Depending on the position of the carrier, the laser beams may be directed either simultaneously at the two DOEs or, as an alternative, at neither of the two DOEs, or each at only one of the two DOEs that is located in the beam path. In an alternative option, the DOEs on the carrier are advantageously introduced into the beam path alternatingly. In particular, the beam patterns are generated with fixed or variable DOEs. Preferably, the fixed DOEs are etched, the variable DOEs are electronically controllable, and can be operated in transmission or reflection mode. The diffractive patterns for the DOEs may have a common body and may be arranged there adjacent to or at a distance from each other, or may be implemented on two separate bodies located in a common holder.

Depending on how different the two DOEs are designed, the expansion of the target laser beam compared with the effective laser beam is more or less pronounced. Here, a precise adjustment of the DOE in question to the wavelength of the effective power laser or of the pilot target laser has the effect that the effective laser beam and the pilot laser beam exit from the DOE with the same beam cross-section. In this case, a beam expansion system after the DOEs is not required for imaging the beam patterns superimposed with identical position, form, and size on the work pieces.

Below, the invention is explained in detail with reference to five embodiments shown in the drawings. Additional characteristics of the invention are given in the following description of each embodiment of the invention in conjunction with the claims and the attached drawing. The individual characteristics may be implemented either by themselves or in combinations of several in different embodiments of the invention. In a schematic representation, the figures of the drawing show details of laser devices according to the invention with a diffractive optical element for generating beam patterns.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
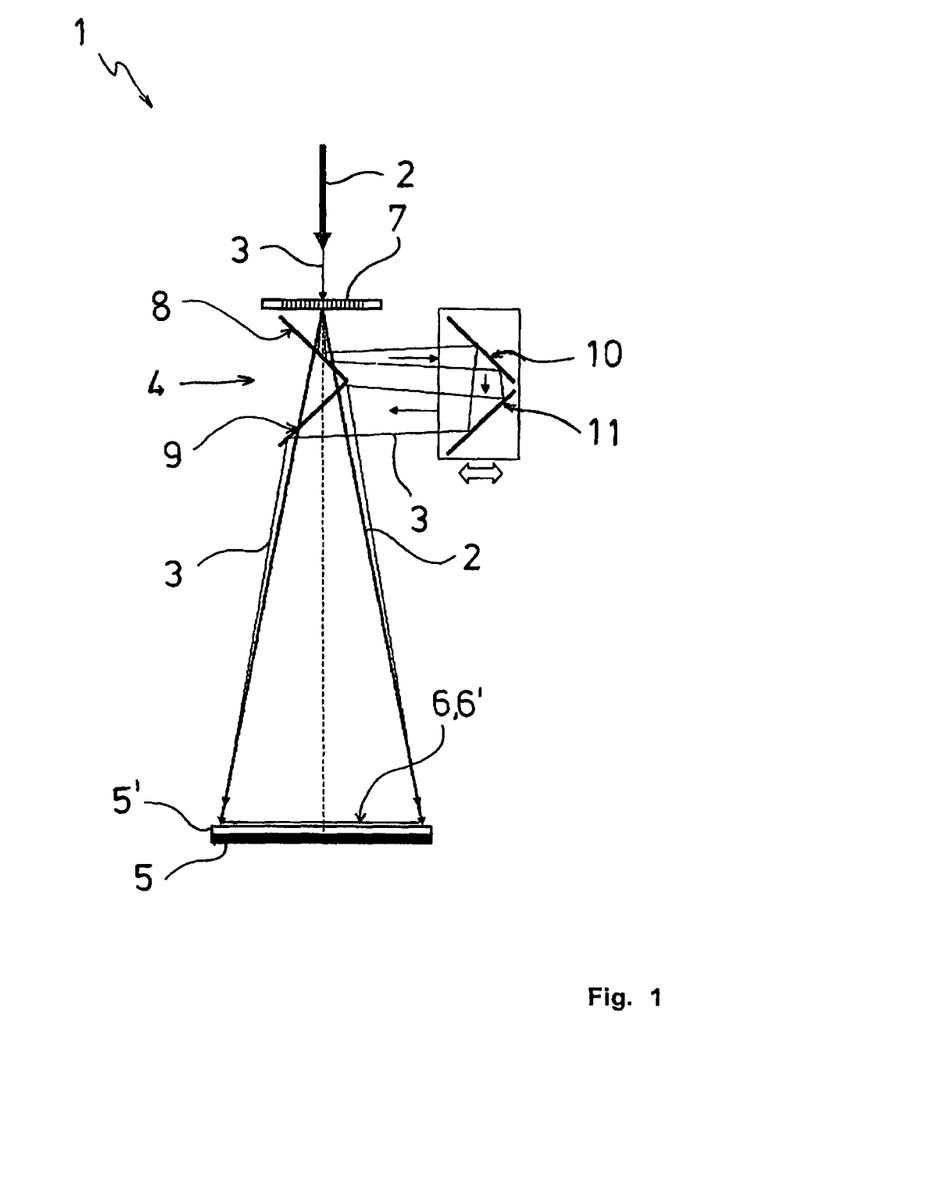
FIG. 1 shows the laser optics of a first laser device where the DOE for the two laser beams is provided in the same direction in transmission mode.

FIG. 1 shows a first laser device 1 according to the invention with an effective power laser (not shown in the drawing) and a pilot target laser (not shown) that act, via the laser optics 4, on two work pieces 5, 5', arranged one on top of the other, by means of an effective laser beam 2 and a pilot laser beam 3. The laser light of the laser beams 2, 3 has a different wavelength, with the wavelength of the pilot laser beam 3 being in the spectral range that is visible to the human eye. By means of the laser optics 4, the effective laser beam 3 is imaged on the work pieces 5, 5' with a beam pattern 6, and the pilot laser beam 3 is imaged with a beam pattern 6'. The beam patterns 6, 6' are superimposed and are identical in form and size.

The laser optics 4 comprise a diffractive optical element (DOE) 7, two dichroic mirrors 8, 9 as beam deflection elements for the pilot laser beam 3, as well as two deflecting mirrors 10, 11 as beam expansion elements for the same. The DOE 7 is aligned parallel to the work pieces 5, 5' and perpendicular to the two arriving laser beams 2, 3. In this case, it is operated in transmission mode. The laser beams 2, 3 pass through the DOE 7 in the same place and are diffracted differently due to their different wavelengths. Therefore, after the DOE 7, the beam cross-section of the pilot laser beam 3 is smaller than that of the effective laser beam 2. In order to match the beam pattern 6' of the pilot laser beam 3 to the beam pattern 6 of the effective laser beam 2, the pilot laser beam 3 is removed after the DOE 7 from the effective laser beam 2.

The removal is effected by means of the dichroic mirror 8 that is closest to the DOE 7, which mirror is arranged at an angle of 45 degrees to the DOE 7 and deflects the pilot laser beam 3 by 90 degrees. The deflected pilot laser beam 3 then arrives at the first deflecting mirror 10 that has the same inclination as the first dichroic mirror 8. This, in turn, directs the laser beam 3 deflected by 90 degrees to the second deflecting mirror 11 that is aligned at an angle of 90 degrees relative to the first deflecting mirror 10. Between the deflecting mirror 10, 11, the pilot laser beam runs parallel to the effective laser beam 2. The second deflecting mirror 11 reflects the laser beam 3 towards the second dichroic mirror 9 which, in turn, deflects the laser beam 3 again by 90 degrees in the direction of the effective laser beam 2.

The two dichroic mirrors 8, 9, which remove the pilot laser beam 3 from the effective laser beam 2 or re-introduce it after the deflecting mirrors 10, 11, are aligned to form an angle of 90 with each other. The effective laser beam 2 passes through the two dichroic mirrors 8, 9 without being influenced by these. The distance of the two deflecting mirrors 10, 11 that are outside the beam path of the effective laser beam 2 can be varied in relation to the dichroic mirrors 8, 9 which makes the path length of the pilot laser beam 3 variable in relation to that of the effective laser beam 2. For every converging laser beam, an increase of the path length has the effect of increasing the beam cross-section with increasing distance from the laser source. This also applies to the pilot laser beam 3 whose path length can be adjusted in relation to that of the effective laser beam 2 in such a way that the beam pattern 6' of the pilot laser beam 3 corresponds in size to the beam pattern 6 of the effective laser beam 2.

Figure 2:
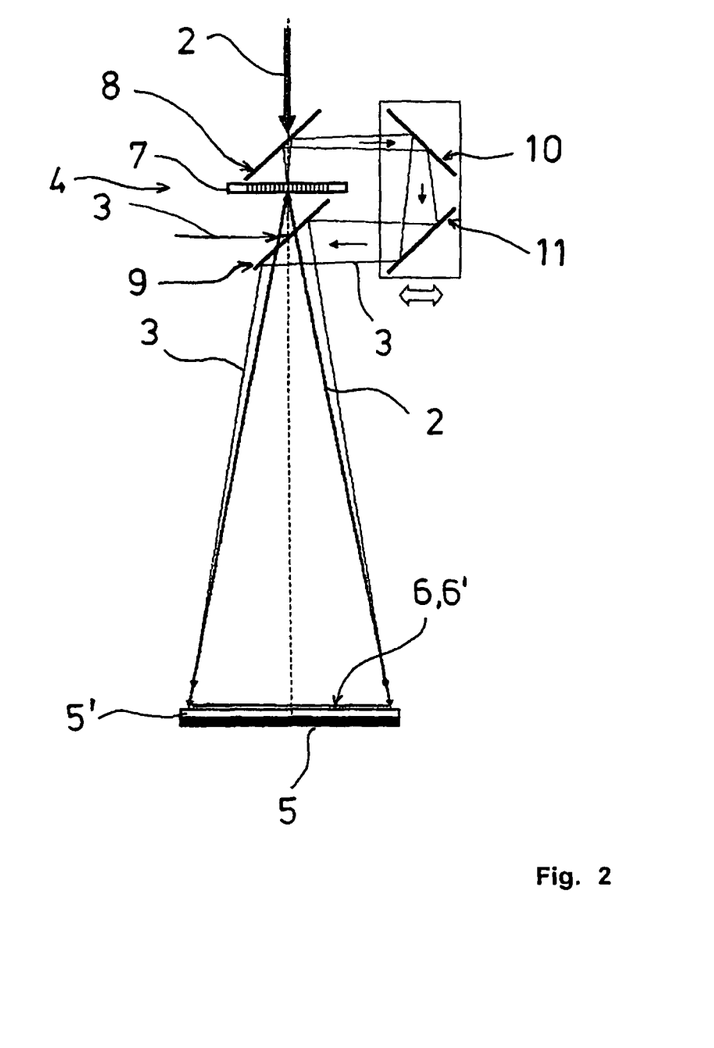
FIG. 2 shows the laser optics of a second laser device where the DOE for the two laser beams is provided in the opposite direction in transmission mode.

FIG. 2 shows the laser optics 4 of a second laser device according to the invention where the pilot laser beam 3 and the effective laser beam 2 arrive at the DOE 7 perpendicularly from different sides. After exiting from their laser sources (not shown in the drawing), the effective laser beam 2 and the pilot laser beam 3 run orthogonal to each other, with the pilot laser beam 3 propagating perpendicular, and the effective laser beam 2 propagating parallel to the optical axis of the laser optics 4.

The pilot laser beam 3 arrives at the laser optics 4 preferably between the DOE 7 and the work pieces 5, 5' and is deflected by a first dichroic mirror 9 located there in the direction of the DOE 7. After passing through the DOE 7, the pilot laser beam 3 arrives at the second dichroic mirror 8 that is arranged parallel to the mirror 9. It is deflected by the mirror 8 in the direction of the two deflecting mirrors 10, 11 that are diametrically opposed to the two dichroic mirrors 8, 9. The two deflecting mirrors 10, 11 direct the pilot laser beam 3 to the first dichroic mirror 9 by means of which the pilot laser beam 3 is re-introduced into the beam path of the effective laser beam 2. As in the embodiment described in FIG. 1, the distance between the deflecting mirrors 10, 11 and the dichroic mirrors 8, 9 is variable. The pilot laser beam 3 is then expanded in the same way as described for FIG. 1.

Figure 3:
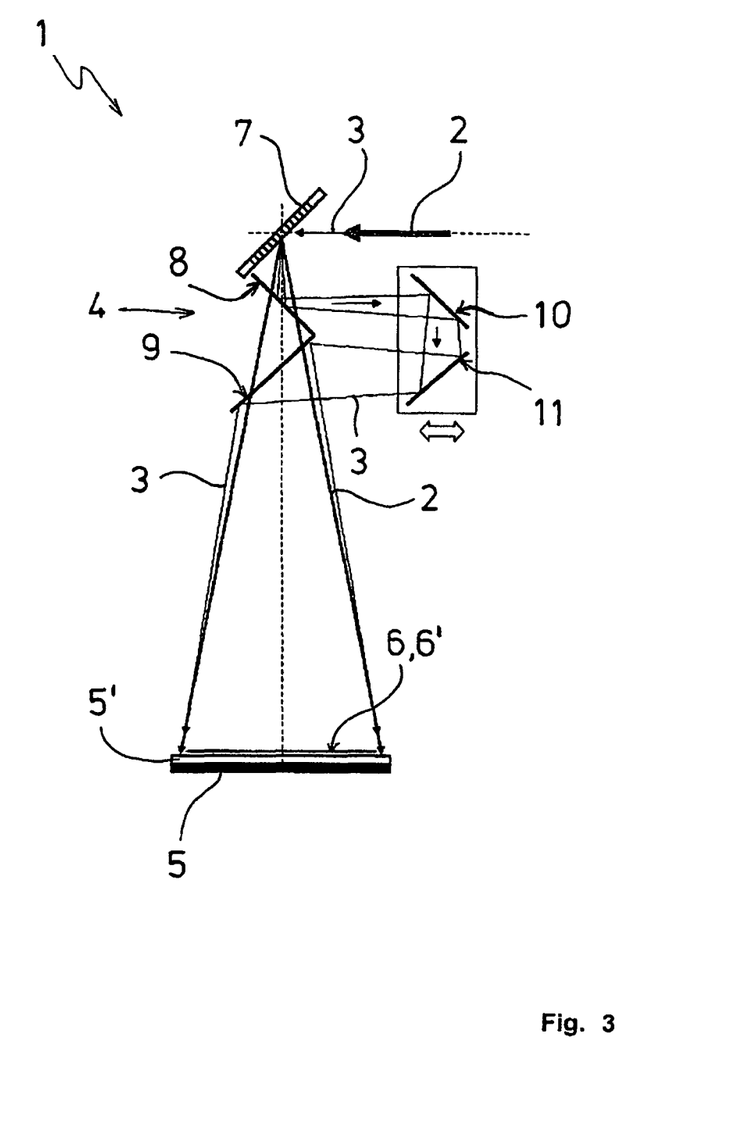
FIG. 3 shows the laser optics of a third laser device where the DOE for the two laser beams is provided in the same direction in reflection mode.

FIG. 3 shows a third embodiment according to the invention where the DOE 7 is operated in reflection mode for the pilot laser beam 3 and the effective laser beam 2. In the laser optics 4, the dichroic mirrors 8, 9 and the deflecting mirrors 10, 11 are arranged opposite the work pieces 5, 5' exactly as in FIG. 1. However, after exiting from the laser sources, the laser beams 2, 3 run parallel to each other and perpendicular to the optical axis of the laser optics 4. They arrive at the DOE 7 from the same side and are jointly reflected by the DOE in the direction of the first dichroic mirror 8. For this purpose, the DOE 7 is arranged with an inclination of 45 degrees relative to the optical axis of the laser optics 4. The further propagation of the two laser beams 2, 3 after the DOE 7 corresponds to the path described in FIG. 1, with the beam expansion of the pilot laser beam 3 being performed in an analogous way.

Figure 4:
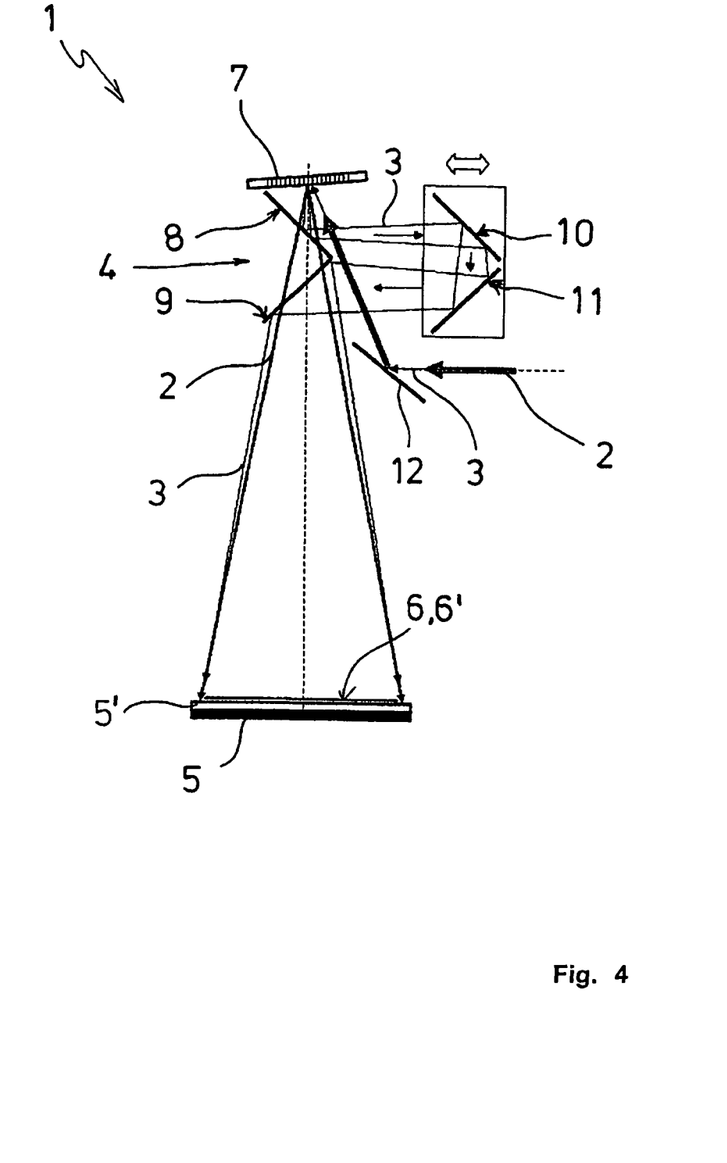
FIG. 4 shows the laser optics of a fourth laser device that, as arrangement variant, corresponds to the third laser device.

FIG. 4 shows a fourth embodiment of the laser device according to the invention that essentially corresponds to the embodiment shown in FIG. 3. After exiting from the laser sources, the laser beams 2, 3 propagate parallel to each other and perpendicular to the optical axis of the laser optics 4, arriving at the laser optics 4 between the dichroic mirrors 8, 9 and the work pieces 5, 5'. By means of a mirror element 12 with total reflection, they are deflected towards the DOE 7, past the dichroic mirrors 8, 9 and the deflecting mirrors 10, 11. The DOE 7 reflects the pilot laser beam 3 and the effective laser beam 2 in the direction of the first dichroic mirror 8. The subsequent expansion of the pilot laser beam 3 is performed as in the embodiments 1, 3 described above.

Figure 5:
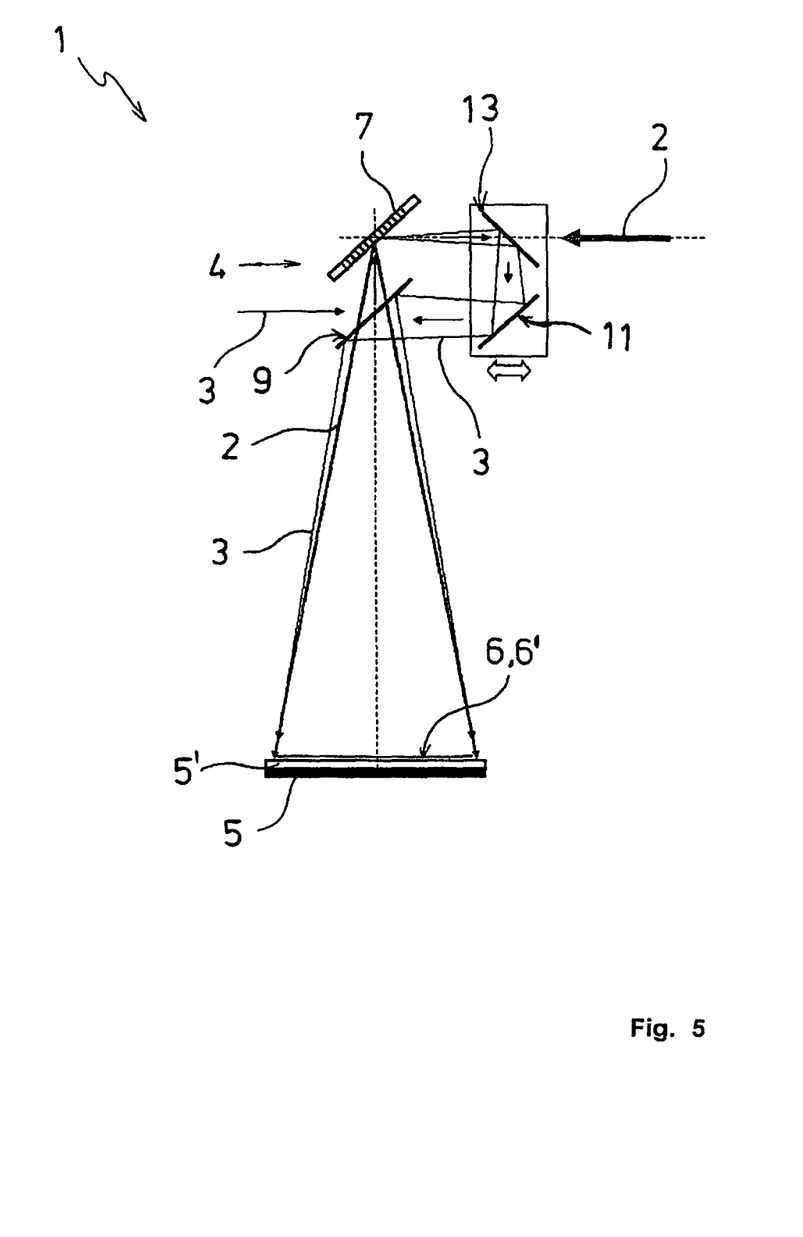
FIG. 5 shows the laser optics of a fifth laser device where the DOE for the two laser beams is operated in the opposite direction in reflection mode.

FIG. 5 shows another embodiment of the invention where the DOE 7 is also used in reflection mode for the two laser beams 2, 3. It differs from the embodiment shown and described in FIG. 3 in that the first wavelength-independent deflecting mirror 10 that was used in the third embodiment and was located in the beam path of the pilot laser beam 3 consists of a wavelength-dependent dichroic mirror 13. The dichroic deflecting mirror 13 is located opposite the DOE 7, with both arranged at an inclination of 45 degrees relative to the optical axis of the laser optics 4. After exiting from the laser source, the effective laser beam 2 and the pilot laser beam 3 propagate from opposite sides parallel to each other and perpendicular to the optical axis of the laser optics 4. The effective laser beam 2 passes the dichroic deflecting mirror 13 from the side facing away from the DOE 7 and arrives at the DOE 7 which reflects the beam 2 to a dichroic mirror 9, located between the DOE 7 and the work pieces 5, 5', and directs it at the work pieces 5, 5'. The pilot laser beam 3 first arrives at the dichroic mirror 9 that is arranged at an angle of 45 degrees relative to the optical axis of the laser optics 4 and parallel to the DOE 7. The mirror 9 deflects the pilot laser beam 3 in the direction of the DOE 7 that passes the beam 3 on to the dichroic deflecting mirror 13 and the wavelength-independent deflecting mirror 11. The deflecting mirror 11 reflects the pilot laser beam 3 in the direction of the dichroic mirror 9 that directs the beam 3 in the direction of the work pieces 5, 5'. The distance of the dichroic deflecting mirror 13 and of the deflecting mirror 10 is variable in relation to the DOE 7 and the dichroic mirror 9 so that the pilot laser beam 3 can be expanded controllably until its beam pattern 6' on the work pieces 5, 5' corresponds to the beam pattern 6 of the effective laser beam 2.

Further features of the invention can be found in the description of preferred embodiments of the invention in connection with the claims and the drawings. The single features can be realised alone or several together in embodiments of the invention.

The invention claimed is:

1. A process for processing and/or joining work pieces by means of laser radiation, with an effective power laser and a pilot target laser that emit an effective laser beam and a pilot laser beam of different wavelengths, using laser optics to image the laser beams of the effective laser beam and of the pilot laser beam on the work pieces, the laser optics having randomly selectable beam patterns that are superimposed and identical in terms of position and form, wherein the form of the beam patterns is determined with at least one diffractive optical element (DOE) that is integrated in the laser optics, and a beam expansions system either with one diffractive optical element being used for the two laser beams and, after the diffractive optical element, the smaller beam cross-section of the pilot laser beam being adjusted to match the larger beam cross-section of the effective laser beam, or with two differently designed diffractive optical elements being used, with one diffractive optical element being associated with each of the two laser beams, with said diffractive optical elements matching the beam cross-section of the pilot laser beam and the beam cross-section of the effective laser beam so that the size of the beam patterns on the work pieces is approximately the same, wherein the beam expansion system includes beam deflection elements, and the processing further comprising using the beam deflection elements to separate the pilot laser beam from the effective laser beam for part of a path length between the diffractive optical element and the work pieces, and in that the cross-section of the pilot laser beam is enlarged after the separation.

2. A process as claimed in claim 1, wherein after the separation from the effective laser beam, the beam cross-section of the pilot laser beam is expanded by means of deflecting mirrors that are arranged at a distance from each other and whose distance from the deflection elements is variable, so that it matches the beam cross-section of the effective laser beam on the work pieces.

3. A process as claimed in claim 1, wherein the pilot laser beam is deflected by means of wavelength-dependent mirrors relative to the effective laser beam.

4. A device for processing and/or joining work pieces by means of laser radiation with an effective power laser and a pilot target laser that emit an effective laser beam and a pilot laser beam of different wavelengths, with laser optics directing the laser beams at the work pieces, and with the laser optics directing the laser beams of the effective laser beam and of the pilot laser beam, imaging said beams on the work pieces with superimposed beam patterns that are identical in terms of position and form, wherein, in order to determine the form of the beam patterns, the laser optics comprise at least one diffractive optical element (DOE) and, in order to determine a uniform size of the beam patterns, a beam expansion system preferably following the diffractive optical element, with the beam expansion system adjusting the size of the beam pattern of the pilot laser beam to match the size of the beam pattern of the effective laser beam, wherein the beam expansion system comprises beam deflection elements for separating the pilot laser beam from the effective laser beam for part of a path length between the diffractive optical element and the work pieces.

5. A device as claimed in claim 4, wherein the diffractive optical element consists of a fixed, preferably etched diffractive optical element.

6. A device as claimed in claim 4, wherein the diffractive optical element consists of a variable, preferably electronically controllable diffractive optical element.

7. A device as claimed in claim 4, wherein the beam expansion system comprises beam expansion elements for enlarging the beam cross-section of the pilot laser beam.

8. A device as claimed in claim 4, wherein the removal from and/or the re-introduction into the effective laser beam of the pilot laser beam is performed with wavelength-dependent mirrors as beam deflection elements.

9. A device as claimed in claim 7, wherein after the removal, the expansion of the pilot laser beam is performed with two deflecting mirrors as expansion elements whose distance from the deflecting elements is variable.

10. A device as claimed in claim 4, wherein the laser optics comprise two diffractive optical elements of which one generates the beam pattern of the effective laser beam and the other generates the beam pattern of the pilot laser beam.

11. A device as claimed in claim 4, wherein the laser optics comprise a second diffractive optical element instead of the beam expansion system, with one diffractive optical element generating the beam pattern of the effective laser beam and the other generating the beam pattern of the pilot laser beam.

12. A device as claimed in claim 10, wherein the two diffractive elements are arranged side by side on a common carrier that is supported in the laser optics so that it can be shifted transversely relative to the effective laser beam or the pilot laser beam.

13. A device as claimed in any claim 10, wherein a fixed, preferably etched diffractive optical element or a variable, preferably electronically controllable diffractive optical element is provided for generating the beam pattern.

* * * * *